UNITED STATES PATENT OFFICE

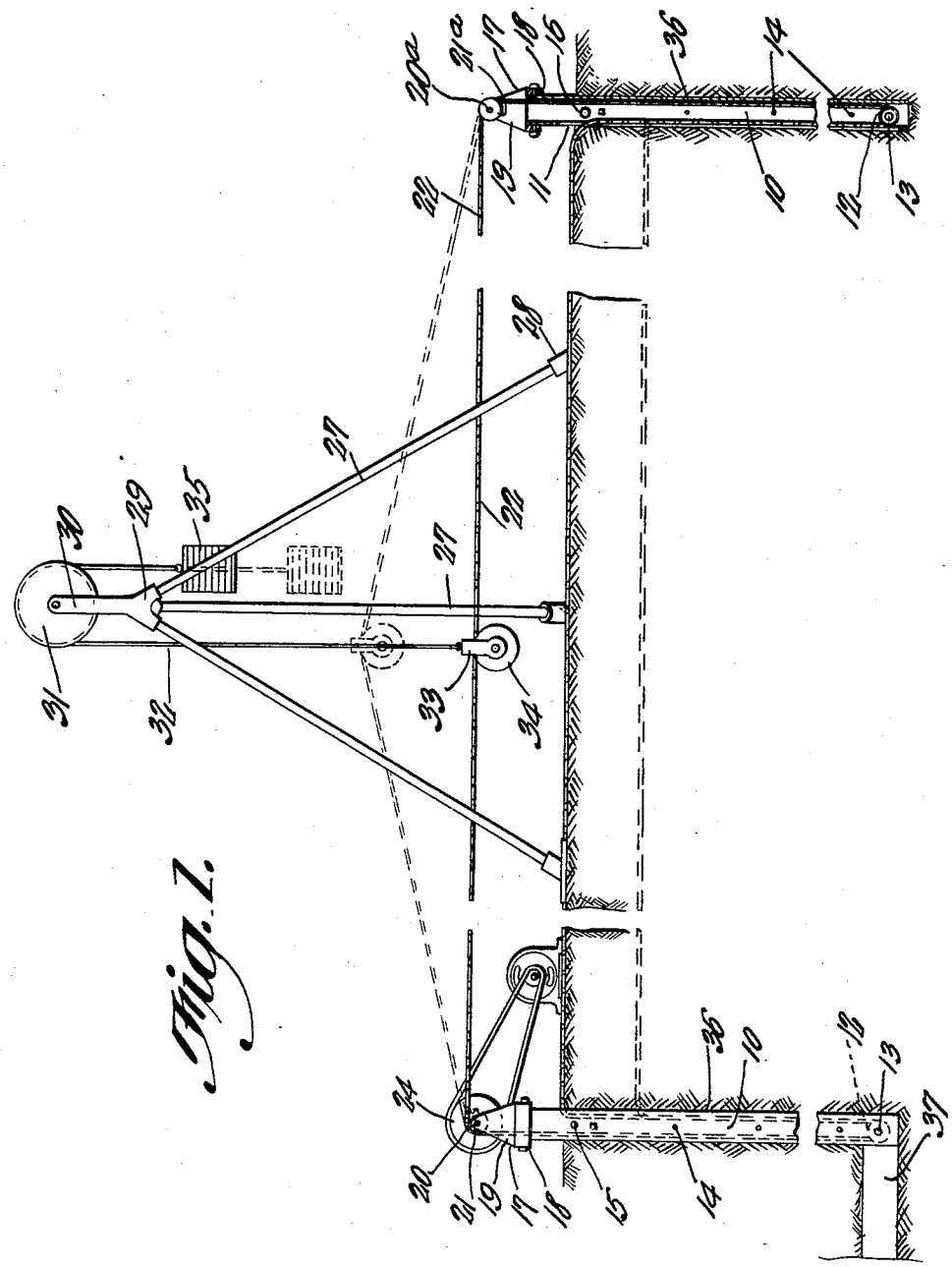

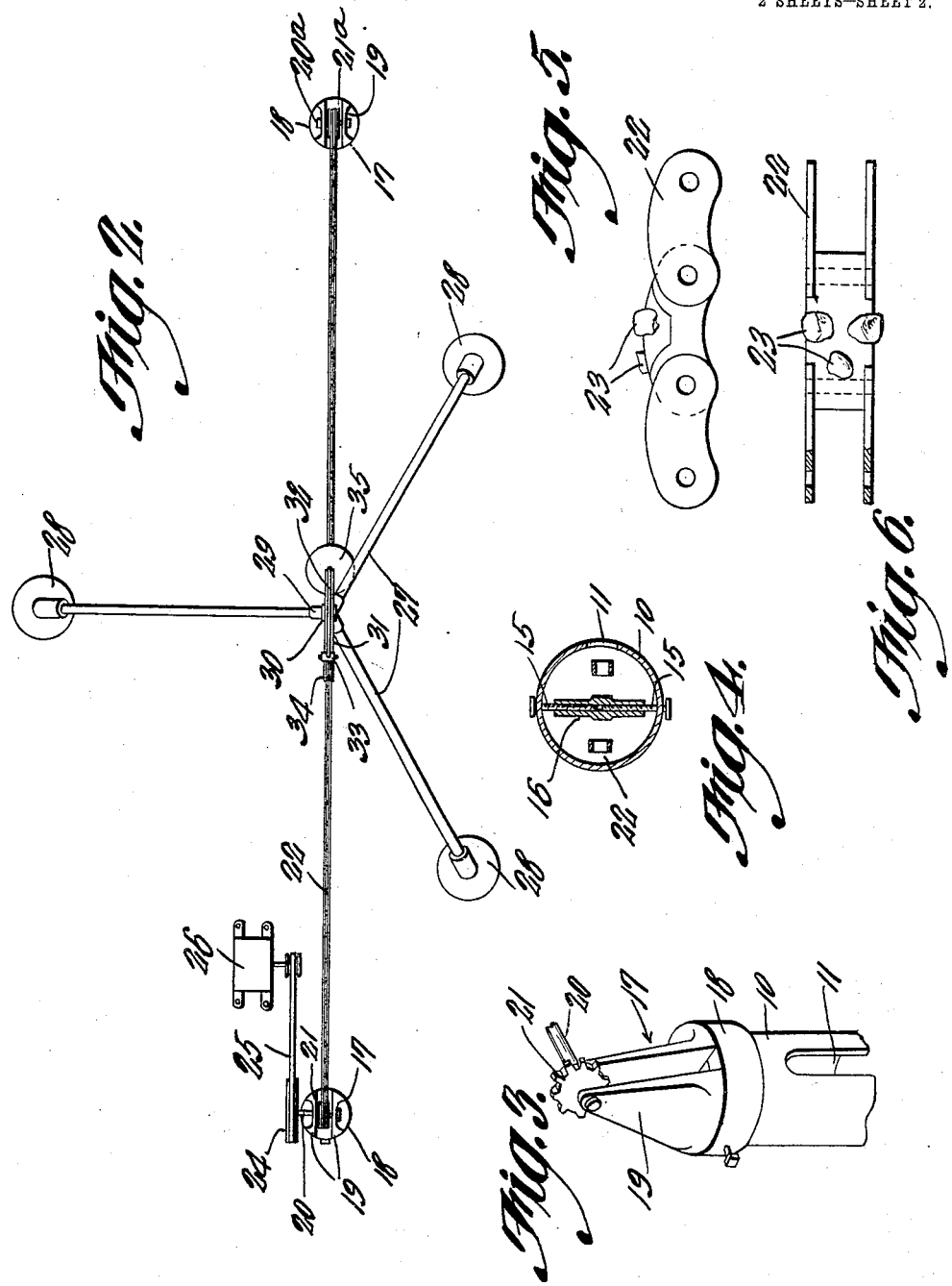

MICHAEL AHEARN, OF DENVER, COLORADO.

STONE-CUTTING APPARATUS.

1,071,016.  Specification of Letters Patent.  Patented Aug. 26, 1913.

Application filed November 25, 1912. Serial No. 733,505.

*To all whom it may concern:*

Be it known that I, MICHAEL AHEARN, a citizen of the United States, residing at Denver, in the county of Denver and State of Colorado, have invented a new and useful Stone-Cutting Apparatus, of which the following is a specification.

The present invention appertains to a stone cutting apparatus for use in quarries and mills, and aims primarily to provide a novel and improved appliance of the character indicated for cutting channels or fissures in the stone or for undercutting the stone in order that the stone may be cut into blocks.

The present invention also comprehends the employment of a pair of members which are adapted to be inserted into holes drilled in the stone, in connection with an endless flexible cutting member guided by the said members so that when the cutting member is actuated, the inner run thereof will saw its way into the stone.

In connection with the foregoing, the object of the present invention is to provide novel means for actuating the cutting member and for taking the slack out of the outer run of the cutting member as the inner run cuts or saws its way into the stone.

To the above and other ends, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The preferred embodiment of the invention is illustrated in the accompanying drawing, wherein similar reference characters have been employed to denote corresponding parts, and wherein:—

Figure 1 is a sectional view illustrating the present apparatus as in use. Fig. 2 is a plan view of the apparatus. Fig. 3 is a fragmental perspective of one of the stone entering members. Fig. 4 is a sectional detail taken through the tubular stone entering member. Fig. 5 is a side elevation of a portion of the cutting member or chain. Fig. 6 is a plan view of the detail shown in Fig. 5.

Referring specifically to the drawing, the two members adapted to enter the holes drilled in the stone have been designated by the numeral 10, each of the said members being constructed of a suitable length of tubular stock and being provided with a longitudinal slot 11. Within the lower or inner end of each tubular member 10, there is pivoted a pulley or rotatable guide 12, the pulley being mounted on an axle or shaft 13 passing through the sides of the tubular member. Each of the tubular members is also provided with a plurality of stays 14 along its length for purpose of bracing the tubular member, especially where it is weakened by the slot 11.

In order to retain the members 10 within the holes drilled in the rock or stone, each of the said members has been provided with a complementary pair of locking members 15 passing through diametrically opposite points of the tubular member 10 adjacent its outer or upper end, the said locking members 16 being screw-threaded and being connected by a turn buckle 16. Thus, by rotating the turn-buckles 16, the locking members 15 may be projected or retracted so as to engage or release the walls of the holes.

A head 17 has been secured to the upper or outer end of each tubular member 10, the said head comprising a collar 18 secured over the end of the tubular member and a pair of upstanding or outwardly projecting cheeks 19. A shaft 20 is journaled through the cheeks 19 of one head, whereas an axle or shaft $20^a$ passes through the cheeks of the other head 17, a sprocket or rotatable guide 21 being secured on the shaft 20 between the cheeks and a pulley or rotatable guide $21^a$ being mounted on the axle or shaft $20^a$ between the corresponding cheeks.

The cutting or sawing member consists in an endless sprocket chain 22, and to certain of the solid links of the chain of alternate solid and twin or open links, there has been secured or inset pieces of carborundum, bort or other abrasive substance so that the said abrasive pieces project from the backs and sides of the links. It is preferable to provide every fourth or fifth solid link with these abrasive members, it being noted that the said abrasive members in projecting from the backs and sides of the links will prevent the links from contacting with the stone, and therefore, a smooth and effective cutting action is accomplished. This chain 22 is trained over the respective rotatable guides 12, 21 and $21^a$ and the lower run passes through the slots 11 of the tubular members 10. Those portions of the chain between the upper and lower runs may pass conveniently through the members 10 so as to be housed within the compass of the said members, and in this manner, the chain is prevented from contacting with the walls of the openings in which the members 10 are inserted. The slots 11, however, permit the lower run of the chain to cut or saw its way into the stone, as the chain is actuated to move about the circuitous path.

As a means actuating the chain or cutting member the shaft 20 has been provided with a pulley 24 over which a belt 25 is trained, the said belt being connected to the driving shaft of a motor or prime mover 26 of any suitable character. It will follow that when the motor is brought into operation, the sprocket 21 will be actuated so as to move the chain.

It is necessary to apply suitable tension to the outer or upper run of the chain for the purpose of drawing the inner run of the chain into the stone or rock, and further, to take up the slack in order that the inner run of the chain may work its way into the stone. To accomplish this result, there has been provided a tripod or frame comprising the legs 27 having the feet or base members 28 secured thereto and connected at their upper ends to a suitable head 29 having the upstanding fork 30. A pulley 31 is journaled within the fork 30, and a flexible member, such as a chain, cord or the like, 32 is trained over the pulley 31 and is connected to the housing 33 of a pulley 34 engaging the upper or outer run of the chain 22. Suitable weights 35 are connected to the other or free end of the flexible member 32, and serve to give an outward tension to the pulley 34 contacting with or engaging the outer run of the cutting member. Thus, as the inner run of the cutting member works its way into the stone, the slack of the outer run will be taken up, or the cutting member will be held taut at all times for the proper operation of the apparatus.

In operation, it is first necessary to drill a pair of holes into the rock or stone to be cut and at the proper points, and after this has been done, the tubular members 10 are inserted into the holes formed. The said members may then be locked in position by projecting the locking members 15 so as to engage the walls of the holes. The tripod is set on the rock or stone between the members 10, and after the length of the chain has been properly adjusted, the apparatus is in condition for operation. The motor or prime mover 26 is then started, so that the chain will be actuated to travel in the proper direction, and necessarily, the inner run of the chain will be drawn over the surface of the stone and will cut its way into the stone. The tension of the weights 35, which may be adjusted as desired, tends to draw the outer run of the chain away from the stone, so that the inner run of the chain will properly cut its way inwardly to provide the channel or fissure. It is preferable to provide an undercut passage 37 leading to the lower end of one of holes 36, in order that the water or other cooling agent poured into the channel or fissure may pass off through the passage 37 in order to carry with it the powdered stone and other extraneous matter. After the channel or fissure has been cut to the required depth, the apparatus may be brought to a stop, and after the locking members 15, have been retracted, the entire apparatus may be withdrawn and rearranged for a new operation.

It is of course understood that the depth and length of the cut or fissure made by the apparatus will depend upon the proportions of the members 10 and the length of the chain or cutting member, it being understood that said parts may be adjusted or constructed in various sizes according to the requirements. It is also possible to employ the present device for under-cutting blocks of stone, or for causing the inner run of the chain to cut its way into the stone in a horizontal plane, it merely being necessary to drill horizontal holes into the stone and to properly position the tripod and the members 10 relative to each other as will be understood by those versed in the art.

From the foregoing, taken in connection with the drawings, the advantages and capabilities of the present apparatus will be manifest, and need not be described at length.

The present apparatus is comparatively simple as well as inexpensive in construction, and in use is both efficient and convenient.

Having thus described the invention, what is claimed as new is:—

1. In a stone cutting apparatus, a pair of slotted tubular members, rotatable guides pivoted to the ends thereof, an endless flexible cutting member trained around the guides with its inner run passing through the slots of the tubular members, and projectable locking means carried by each of the tubular members for engaging the walls of the holes in which the tubular members are inserted.

2. In a stone cutting apparatus, a pair of members insertible into holes in the stone to be cut, rotary guides pivoted to both ends of the said members, an endless cutting member trained around the guides, a pair of bolts carried by the first mentioned members, and a turn buckle connecting the bolts for projecting them into locking engagement with the walls of the holes.

3. In a stone cutting apparatus, a pair of tubular members insertible into holes in the stone to be cut, rotary guides pivoted to both ends of the said members, an endless cutting member trained around the guides, the first mentioned members having slots through which the inner run of the cutting member passes and having passages through which those portions of the cutting member between the respective guides pass, and means carried by the first mentioned members for engaging the walls of the holes into which they are inserted.

4. In a stone cutting apparatus, a pair of slotted tubular members insertible into holes in the stone to be cut, rotary guides pivoted within the lower ends of the tubular members, collars secured to the upper ends of the tubular members and having upstanding cheeks, shafts journaled through the cheeks, rotary guides mounted on the shafts between the cheeks, an endless cutting member trained around all of the guides, the inner run of the cutting member passing through the slots and those portions of the cutting member between the respective guides passing within the tubular members, and means carried by the tubular members for engaging the walls of the holes in which they are inserted.

In testimony that I claim the foregoing as my own, I have hereto affixed my signature in the presence of two witnesses.

MICHAEL AHEARN.

Witnesses:
H. E. FISKE,
A. W. OAKES.

Copies of this patent may be obtained for five cents each, by addressing the "Commissioner of Patents, Washington, D. C."